(12) United States Patent
Katsurada et al.

(10) Patent No.: US 8,626,508 B2
(45) Date of Patent: Jan. 7, 2014

(54) SPEECH SEARCH DEVICE AND SPEECH SEARCH METHOD

(75) Inventors: Koichi Katsurada, Toyohashi (JP); Tsuneo Nitta, Toyohashi (JP); Shigeki Teshima, Toyohashi (JP)

(73) Assignee: National University Corporation TOYOHASHI UNIVERSITY OF TECHNOLOGY, Toyohasi-shi (JP)

( * ) Notice: Subject to any disclaimer, the term of this patent is extended or adjusted under 35 U.S.C. 154(b) by 7 days.

(21) Appl. No.: 13/203,371

(22) PCT Filed: Feb. 10, 2010

(86) PCT No.: PCT/JP2010/051937
§ 371 (c)(1),
(2), (4) Date: Sep. 22, 2011

(87) PCT Pub. No.: WO2010/098209
PCT Pub. Date: Sep. 2, 2010

(65) Prior Publication Data
US 2012/0036159 A1    Feb. 9, 2012

(30) Foreign Application Priority Data
Feb. 26, 2009    (JP) .................. 2009-044842

(51) Int. Cl.
G10L 15/00    (2013.01)
G10L 17/00    (2013.01)
G10L 15/06    (2013.01)
G10L 21/00    (2013.01)
G10L 25/00    (2013.01)
G06F 7/00    (2006.01)
G06F 17/30    (2006.01)

(52) U.S. Cl.
USPC ........... 704/254; 704/231; 704/235; 704/249; 704/243; 704/241; 704/251; 704/270; 704/246; 707/770; 707/707; 707/749; 707/738; 707/706; 707/711; 707/781; 707/713; 707/769

(58) Field of Classification Search
USPC .................. 704/9, 231–257, 275, 270, 270.1; 707/706, 738, 749, 711, 781, 770, 769, 707/713, 780, 736, 748
See application file for complete search history.

(56) References Cited

U.S. PATENT DOCUMENTS 5,577,162 A * 11/1996 Yamazaki ..................... 704/232
(Continued)

FOREIGN PATENT DOCUMENTS

CN    1604185 A    4/2005
(Continued)

OTHER PUBLICATIONS

Satoru Takabayashi, Writing Assistance through Search Techniques, Feb. 9, 2001, Department of Information Processing, Graduate School of Information Science, Nara Institute of Science and Technology, Master's Thesis.*

(Continued)

*Primary Examiner* — Paras D Shah
*Assistant Examiner* — Anne Thomas-Homescu
(74) *Attorney, Agent, or Firm* — Oblon, Spivak, McClelland, Maier & Neustadt, L.L.P.

(57) ABSTRACT

Provided are a speech search device, the search speed of which is very fast, the search performance of which is also excellent, and which performs fuzzy search, and a speech search method. Not only the fuzzy search is performed, but also the distance between phoneme discrimination features included in speech data is calculated to determine the similarity with respect to the speech using both a suffix array and dynamic programming, and an object to be searched for is narrowed by means of search keyword division based on a phoneme and search thresholds relative to a plurality of the divided search keywords, the object to be searched for is repeatedly searched for while increasing the search thresholds in order, and whether or not there is the keyword division is determined according to the length of the search keywords, thereby implementing speech search, the search speed of which is very fast and the search performance of which is also excellent.

10 Claims, 12 Drawing Sheets

(56) References Cited

U.S. PATENT DOCUMENTS

| | | | |
|---|---|---|---|
| 5,867,816 A * | 2/1999 | Nussbaum | 704/232 |
| 2007/0083371 A1* | 4/2007 | Jeong et al. | 704/256 |
| 2007/0143110 A1* | 6/2007 | Acero et al. | 704/251 |
| 2007/0208561 A1* | 9/2007 | Choi et al. | 704/231 |
| 2007/0225975 A1* | 9/2007 | Imoto | 704/233 |
| 2008/0208597 A1* | 8/2008 | Chino et al. | 704/277 |
| 2008/0221893 A1* | 9/2008 | Kaiser | 704/257 |
| 2008/0255841 A1 | 10/2008 | Hanazawa et al. | |
| 2008/0294431 A1* | 11/2008 | Miyamoto et al. | 704/231 |
| 2009/0099841 A1* | 4/2009 | Chen | 704/9 |
| 2009/0281807 A1* | 11/2009 | Hirose et al. | 704/254 |
| 2010/0063819 A1* | 3/2010 | Emori | 704/251 |
| 2011/0307254 A1* | 12/2011 | Hunt et al. | 704/235 |

FOREIGN PATENT DOCUMENTS

| | | |
|---|---|---|
| JP | 5 35292 | 2/1993 |
| JP | 2005 257954 | 9/2005 |
| JP | 2005257954 A * | 9/2005 |
| WO | 2005 122002 | 12/2005 |

OTHER PUBLICATIONS

Kuriki, G., et al., "Open Vocabulary Spoken Document Retrieval using Phone Sequence Obtained from a General Speech Recognizer," The Institute of Electronics, Information and Communication Engineers, IEICE Technical Report, SP2008-53, pp. 61-66, (Jul. 2008) (with English Abstract).

Yamasita, T., et al., "Full Text Approximate String Search using Suffix Arrays," IPSJ SIG Technical Reports, pp. 23-30, (Sep. 11, 1997) (with English Abstract).

Kanda, N., et al., "Open-Vocabulary Keyword Detection from Super-Large Scale Speech Database," IEEE, MMSP 2008, pp. 939-944, (2008).

Thambiratnam, K., et al., "Dynamic Match Phone-Lattice Searches for Very Fast and Accurate Unrestricted Vocabulary Keyword Spotting," IEEE, ICASSP 2005, pp. I-465-I-468, (2005).

International Search Report issued Apr. 20, 2010 in PCT/JP10/051937 filed Feb. 10, 2010.

Combined Chinese Office Action and Search Report issued Jan. 15, 2013 in Chinese Patent Application No. 201080009141.X (with English Translation of Categories of Cited Documents).

* cited by examiner

SPEECH SEARCH DEVICE AND SPEECH SEARCH METHOD

TECHNICAL FIELD

The present invention relates to a speech search device and a speech search method. More specifically, it relates to a device and a method for searching for speeches speedily and efficiently.

BACKGROUND ART

With the prevalence of a broadband line and the advancement in information and communications technology, opportunities for utilizing contents of speeches and moving images on a web are increasing and the number of contents is rapidly increasing. Accordingly, to efficiently search for data of the speeches and the moving images on the web and to use them, speech search technologies are indispensable. In particular, a high-speed search system is desired.

To meet such a need, conventional technologies described in Non-patent Literatures 1 and 2 propose a method for performing high-speed search by creating index data from a speech database and utilizing it.

Further, the conventional technology described in Patent Literature 1 describes combining a suffix array and dynamic programming for the purpose of elimination of spelling inconsistency in document search and its speed-up.

CITATION LIST

Patent Literature

Patent Literature 1: International Patent Publication No. 2005/122002

Non-Patent Literature

Non-patent Literature 1: N. Kanda, et al., "Open-Vocabulary Keyword Detection from Super-Large Scale Speech Database," IEEE MMSP 2008, pp. 939-944, 2008.
Non-patent Literature 2: K. Thambiratnam & S. Sridharan, "Dynamic Match Phone-Lattice Searches For Very Fast And Accurate Unrestricted Vocabulary Keyword Spotting," ICASSP 2005, vol. 1, pp. 465-468, 2005.

SUMMARY OF INVENTION

Technical Problem

The conventional technology described in the aforementioned Patent Literature 1 would target document search but not fuzzy search for a phoneme string by means of speech recognition in accordance with the present invention. In particular, it is self-evident that time required in calculation increases remarkably in the case of combining a simple suffix array and dynamic programming.

On the other hand, in the aforementioned conventional technologies (Non-patent Literatures 1 and 2), if the speech database is of a large scale, the conventional speech search speed-up methods must create index data commensurate with the scale of the database. This leads to a need for provision of a high-speed secondary storage, which is undesirable in terms of costs.

Further, as compared to the main storage, the secondary storage needs a longer time in access and so has a disadvantage in that its search is slowed down.

Moreover, the index data is typically created from a word or a sub-word, which approach is based on the presumption that a search keyword (or sub-keyword) and the word or sub-word should agree with each other completely, so that there is a possibility that the existing speech recognition method subject to mis-recognition could not provide sufficient search performances.

In view of the above problems, it is an object of the present invention to provide a speech search device and a speech search method that performs fuzzy search without requiring a secondary storage and at a high search speed and low search costs and has good search performances.

Solution to Problem

In speech search in accordance with the present invention, specifically, the speech search device and the speech search method for performing fuzzy search has the following configurations.

The invention of claim 1 provides a speech search device for receiving a speech as an input and searching for speech data obtained by sampling the input speech, the speech search device comprising a database-use speech recognizer that recognizes the speech recorded in the speech database, a speech-use phoneme string generation unit that generates a phoneme string from a word string recognized by the database-use speech recognizer, a suffix array generation unit that generates a suffix array from the phoneme string generated by the speech-use phoneme generation unit, an input device that inputs a search keyword, an input phoneme generation unit that generates the phoneme string from the search keyword input by the input device, a speech search unit that searches the suffix array for the search keyword by dynamic programming, and an output device that outputs a result of the search by the speech search unit, wherein the speech search unit includes means for setting first threshold to be used in search and means for searching for a search object by dynamic programming by using the first threshold.

This speech search device, which receives a speech as an input and searches for speech data obtained by sampling the input speech, performs fuzzy search by using a suffix array and dynamic programming. It performs matching with a search keyword in units of a phoneme and so enables search even if the search keyword does not completely agree with a word or sub-word registered in an index.

The invention of claim 2 provides the speech search device according to claim 1, wherein the speech search unit further comprises means for, if the search keyword is at least a predetermined length, dividing the search keyword based on the phoneme, and means for determining a second threshold to be used in search for the keyword divided by the search keyword division means, from the first threshold, and wherein the search object search means searches for the object by dynamic programming by using the second threshold.

In addition to the invention of claim 1, the speech search device having the above configuration divides a search keyword, changes the first threshold to be used in search to permit matching at least two positions, determines the number of divided phonemes in accordance with the length of the keyword, and determines whether to divide or not, thereby performing high-speed search. This alteration of the first threshold to be used in search so that matching may be performed at least two positions is carried out in accordance with the following first equation (that is, Math. 1)

$$t' = \frac{p}{p-1}t \quad \text{[Math. 1]}$$

In this equation, p is the number of divisions, t is an original first threshold obtained by the means for determining a search threshold for the plurality of divided search keywords, and t' is a second threshold obtained after alteration by the threshold alteration means.

The invention of claim 3 provides the speech search device according to claim 1 or 2, wherein the speech search unit comprises threshold adjustment means for repeatedly performing search as increasing the first threshold consecutively and consecutively present a result of the search.

The above configuration is provided with a threshold adjustment function to repeatedly perform search as consecutively increasing the first threshold to be used in search by iterative lengthening search (a kind of iterative deepening search) and consecutively present a result of the search. It performs an improvement in sensory search speed by consecutively presenting new search results as updating the threshold while a user of the device is confirming initially presented search results.

The invention of claim 4 provides the speech search device according to anyone of claims 1 to 3, in which the speech search unit further includes means for determining whether or not keyword division is necessary based on the length of the search keyword and keyword division means for determining the number of the phonemes after the keyword is divided.

The device having the above configuration can determine whether or not keyword division is necessary based on the length of the search keyword and determine the number of the phonemes after the keyword is divided.

The invention of claim 5 provides the speech search device according to any one of claims 1 to 4, wherein the means for searching for the search object by dynamic programming further comprises means for calculating similarity between the phonemes by using an inter-phoneme distance based on phoneme discrimination features in dynamic programming.

The above inter-phoneme distance may come in, for example, a Hamming distance of a difference between the phoneme discrimination features. Accordingly, in the above configuration, the inter-phoneme similarity would be calculated using the Hamming distance.

The invention of claim 6 provides a speech search method for receiving a speech as an input and searching for speech data obtained by sampling the input speech, the speech search method comprising the steps of creating a suffix array by converting the speech data into a phoneme string, receiving a search keyword and converting it into the phoneme string, setting a first threshold to be used in search, searching for a search object by dynamic programming by using the first, and outputting a result of the search performed in the searching step.

The speech search method having the above configuration performs fuzzy search by using a suffix array and dynamic programming (hereinafter referred to as DP matching in some cases). It performs matching with a search keyword in units of a phoneme and so enables search even if the search keyword does not completely agree with a word or sub-word registered in an index.

The invention of claim 7 provides the speech search method according to claim 6, further comprising the steps of, if the search keyword is at least a predetermined length, dividing this search keyword based on the phoneme, and determining a second threshold to be used in search for the keyword divided in the search keyword dividing step, from the first threshold, wherein the search object searching step searches for the object by dynamic programming by using the second threshold.

The speech search method having the above configuration divides a search keyword, changes the first threshold to be used in search to permit matching at least two positions, determines the number of divided phonemes in accordance with the length of the keyword, and determines whether to divide or not, to prevent exponential explosion of processing time, thereby performing high-speed search. It is to be noted that the second threshold to be used in search for the divided keyword can be determined on the basis of Equation 1 given in Math. 1.

The invention of claim 8 provides the speech search method according to claim 6 or 7, further comprising a threshold adjusting step of repeatedly performing search as increasing the first threshold consecutively.

The speech search method having the above configuration is provided with a threshold adjustment function to repeatedly perform search as consecutively increasing the first threshold to be used in search by iterative lengthening search (a kind of iterative deepening search) and consecutively present a result of the search. Initial search having the small first threshold approximates binary search owing to features of the suffix array and so is very speedy in performance.

The invention of claim 9 provides the speech search method according to any one of claims 6 to 8, further comprising a step of determining whether or not keyword division is necessary based on the length of the search keyword and a keyword division step of determining the number of the phonemes after the keyword is divided.

The speech search method having the above configuration is processed so as to enable determining whether or not keyword division is necessary based on the length of the search keyword and determining the number of the phonemes after the keyword is divided.

The invention of claim 10 provides the speech search method of any one according to claims 6 to 9, wherein the step of searching for the search object includes a step of calculating similarity between the phonemes by using an inter-phoneme distance based on phoneme discrimination features in dynamic programming.

The speech search method having the above configuration enables such processing as calculating similarity between the phonemes by using an inter-phoneme distance (for example, Hamming distance of a difference between the phoneme discrimination features) based on phoneme discrimination features in the dynamic programming.

Advantageous Effects of Invention

The present invention does not need a large data region and so can eliminate the need for a high-speed secondary storage to reduce costs necessary for preparation of secondary storage. That is, it is possible to provide a speech search device and a speech search method that has a high search speed and low search costs as well as good search performances.

DESCRIPTION OF EMBODIMENTS

The following will describe a speech search device and a speech search method in an embodiment of the present invention with reference to the drawings. It is to be noted that these drawings are used to explain technological features that can be employed in the present disclosure and constitutions of an apparatus and flowcharts of a variety of processing are just illustrative and not intended to be restrictive unless otherwise specified.

Figure 1:
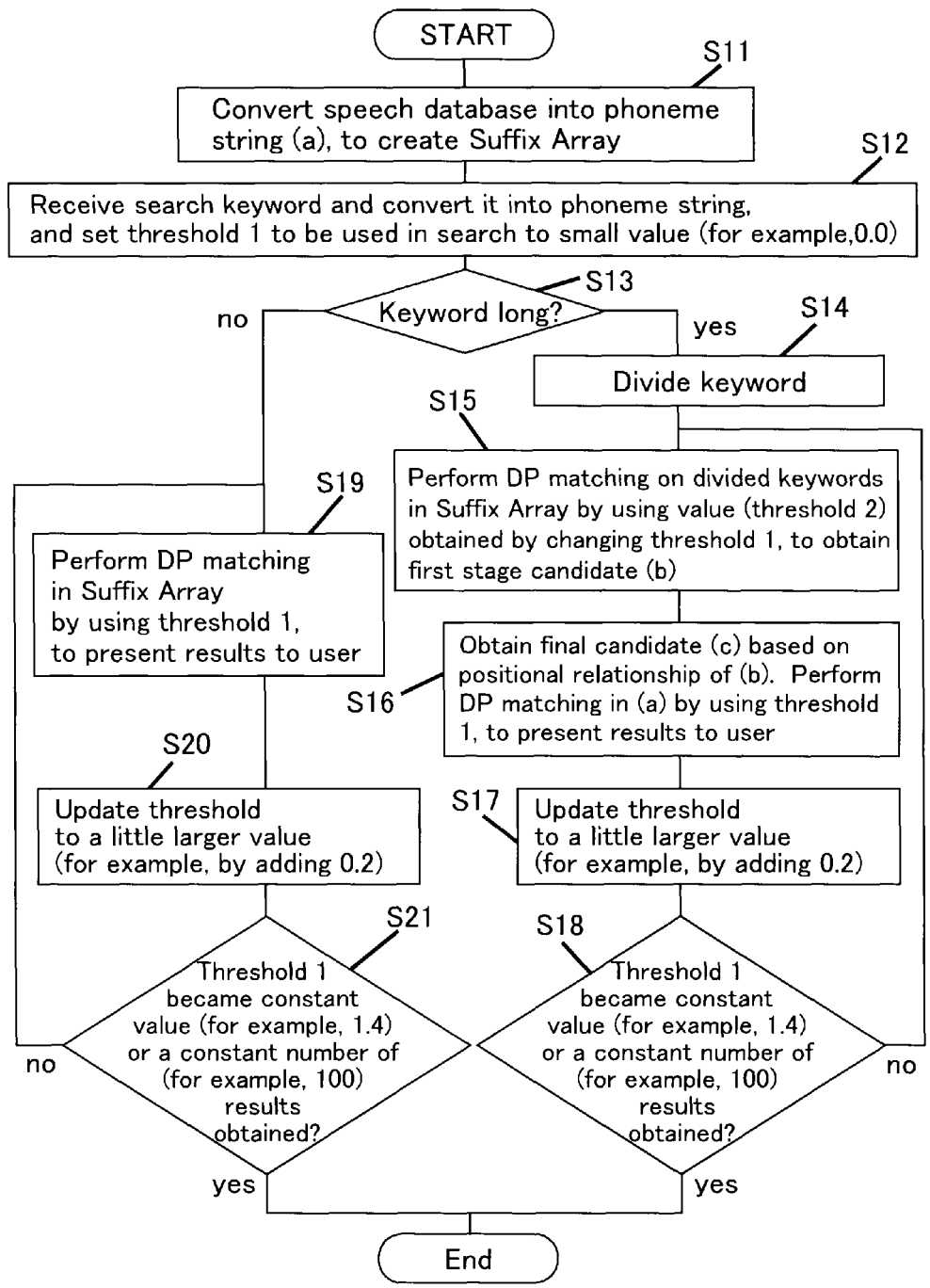
FIG. 1 is a flowchart of speech search according to the present invention.

A description will be given of an embodiment of the speech search method according to the present invention with reference to a flowchart in FIG. 1. The present embodiment receives a speech as an input upon start and performs fuzzy search on speech data obtained by sampling this input speech (by using 16 sampling bits and a sampling frequency of 44.1 kHz, for example) by using both a suffix array and DP matching.

First, speech data recorded in a speech database is converted into a phoneme string (a), to create a suffix array from this phoneme string (a) (S11). Next, a search keyword is received and converted into a phoneme string (S12). Simultaneously with this processing, a first threshold (written as threshold 1 in FIG. 1) to be used in search is set (S12). In the processing, if the search keyword converted into the phoneme string has at least a predetermined length (for example, at least 9 phonemes), it is to be divided and, otherwise, not to be divided, based on which presumption a determination is made as to whether to divide it or not (S13). If it is determined that it should be divided, this search keyword is divided into a predetermined number of phonemes (S14). In this case, the number of the post-division phonemes can be determined beforehand. For example, by setting the number of the post-division phonemes to 3, if the search keyword includes 9 phonemes, it can be divided into three pieces every 3 phonemes. Further, if the search keyword includes 10 to 12 phonemes, it can be divided into four pieces.

The divided keywords are determined as to whether there is similarity among them by calculating a distance between phoneme discrimination features included in the speech data.

That is, a second threshold (written as threshold 2 in FIG. 1) is determined from the first threshold by using the equation given in Math. 1 and DP matching is performed on the keywords divided using this second threshold in the suffix array (S15). A result of this processing is saved as a first stage candidate (b) temporarily (S15), so that a final candidate (c) is determined on the basis of a positional relationship of this first stage candidate (b) (S16). Further, DP matching is performed on the result of this final candidate (c) in a suffix array (a) by using the first threshold, a result of which is output (presented to the user) (S16). This ends primary search.

In the present embodiment, after the primary search ends, the first threshold is updated to a little larger value (for example, by adding 0.2), to repeat the searching step again in processing (S17, S18). Since the first threshold is updated to a little larger value, the second threshold calculated on the basis of the first threshold also becomes a little larger value. Accordingly, search is performed for similar words (words with similar phoneme strings) having a certain degree of distance between the phoneme discrimination features. It is to be noted that the repetition of the searching step can be processed to end if the first threshold reaches a predetermined value or the total number of the search results reaches a predetermined value (S18). For example, it can be processed to end if the first threshold reaches 1.4 or the total number of the search results reaches 100.

Next, if the search keyword is short (for example, the number of the phonemes is eight or less), DP matching is performed in the suffix array (a) by using the first threshold without dividing the search keyword (S19). In this case, only the first threshold is used. Then, a result obtained in such a manner is output (presented to the user) as it is (S19). Since the search keyword is not divided, it is unnecessary to reference the positional relationship of the matching result.

It is to be noted that even in a case where the search keyword is not divided, the first threshold is updated to a little larger value (for example, by adding 0.2) (S20), to repeat the searching step again (S21). This is done so in order to search for similar words (words with similar phoneme strings) having a longer distance between the phoneme discrimination features. It is to be noted that the repetition of the searching step can be processed to end if the updated threshold reaches a predetermined value or the number of the search results reaches a predetermined number.

By such a search method, initial search by use of a small first threshold approximates binary search in search conditions, so that high-speed search can be performed for phoneme strings very close to the search keyword. Further, by gradually increasing the first threshold, a kind of iterative deepening search can be performed. Moreover, by consecutively outputting (presenting to the user) the first threshold before updating it, the phoneme strings can be output sequentially in order in which they are closer to the search keyword. Although the present embodiment exemplified a case where a boundary with which to determine whether the search keyword is long or short in keyword division would be set to at least 9 phonemes, the boundary with which to determine whether the search keyword is long or short can be set to 18 if the number of the post-division phonemes is set to 6. If the number of the post-division phonemes is small, the number of the first stage candidates (b) becomes enormous, so that the processing rate may possibly slow down. To solve this problem, the number of the post-division phonemes can be adjusted, to speed up the search further.

It is to be noted that the above search method can be constituted so that the processing may end without updating the first threshold. In this case, although phoneme strings obtained by search are restricted to those similar to a search keyword, the first threshold can be set a little larger so that more phoneme strings may be searched for in one searching step.

Further, in keyword division, although the step (S13) is provided to determine whether or not keyword division is necessary, such a step can be omitted in processing so that the keyword would be divided into a predetermined number of phonemes or not be divided. If such a processing as to divide it into the predetermined number of phonemes is selected, it must be divided into at least 3 phonemes in order to calculate the second threshold from the first threshold by the equation given in Math. 1, so that it is necessary to give a step of determining whether the number of divided keyword pieces after the keyword is divided into the predetermined number of phonemes is less than 3 or not less than 3.

Figure 2:
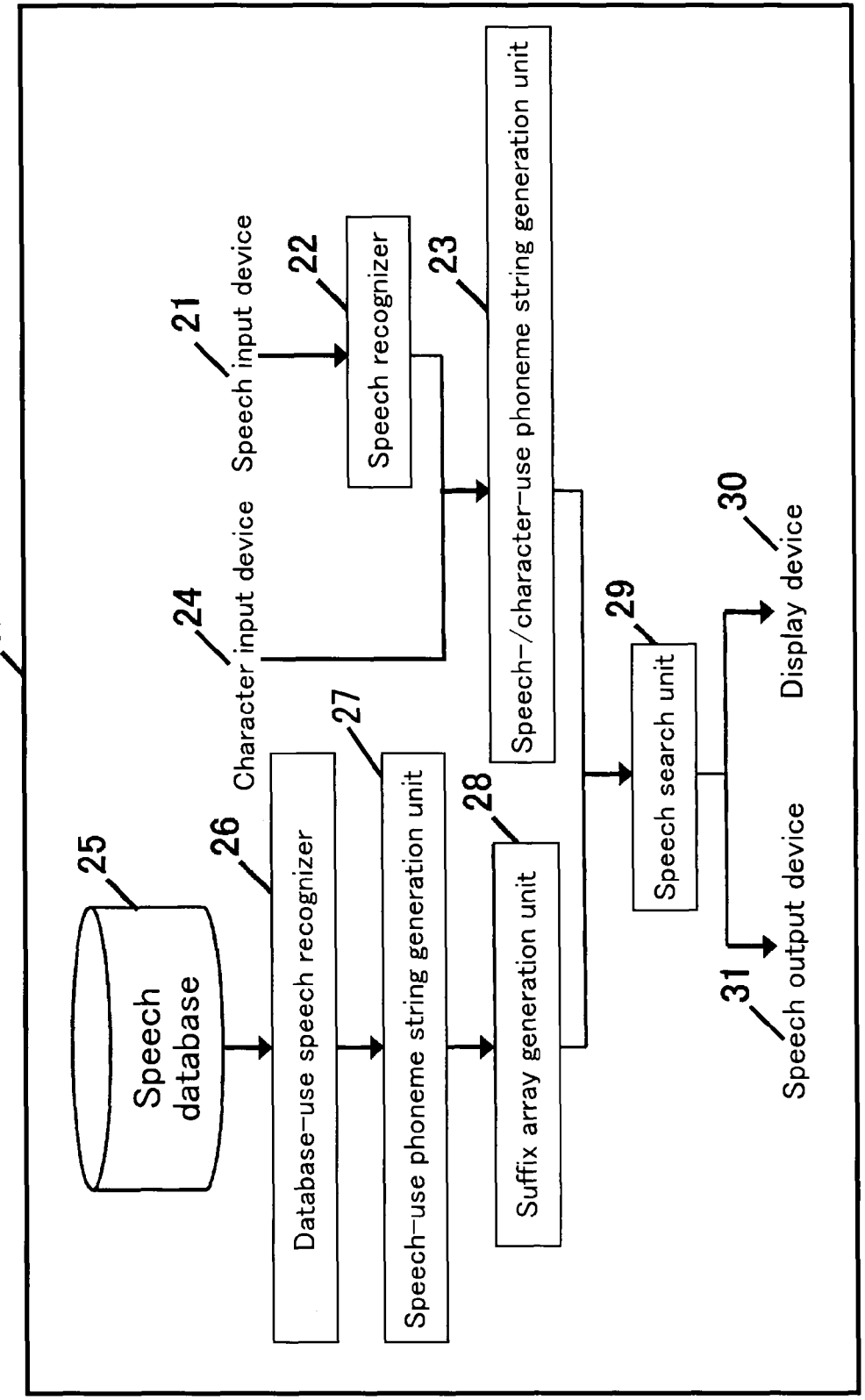
FIG. 2 is a block diagram of an internal configuration of the speech search according to the present invention.

In contrast, the embodiment of the speech search device according to the present invention is configured as shown in the internal constitution block diagram in FIG. 2. In the present embodiment, means for performing fuzzy search is realized by storing a large-scale speech data sampled beforehand (for example, the number of sampling bits: 16, sampling frequency: 44.1 kHz) in a speech database 25, and using both a suffix array creation unit 28 and a speech search unit 29 that performs DP matching.

A speech search device 31 in the present embodiment is provided with the speech database 25, a database-use speech recognizer 26, a speech-use phoneme string generation unit 27, and the suffix array creation unit 28, to create a suffix array from speech data. On the other hand, it is also provided with input devices 21 and 24 and a phoneme string generation unit 23 in order to create a phoneme string of an input search keyword. One of the input devices 21 and 24 is a speech input device (microphone, for example) 21 and the other is a character input device (keyboard, for example) 24. In configuration, both of those two different input means or only either one of them may be mounted. However, in the case of mounting the speech input device (microphone, for example) 21, it is necessary to mount a speech recognizer 22. Then, a keyword input as a word string or obtained by converting speech into a word string is converted into a phoneme string in the phoneme string generation unit 23. Description of the "speech-/character-use phoneme string generation unit" in FIG. 2 is intended to accommodate both of a case where the input is speech and a case where the input is a character.

As shown in FIG. 2, in configuration, information of a suffix array created from speech data and information of a phoneme string of an input search keyword undergo search processing in the speech search unit 29. The speech search unit 29 is provided with means for setting a first threshold to be used in search, means for, if the search keyword has at least a predetermined length, dividing this search keyword based on phonemes, means for determining a second threshold from the first threshold, the second threshold being used in search for keywords divided by the search keyword division means, and means for searching for a search object by dynamic programming by using either one of the first and second thresholds.

Therefore, the means for calculating a distance between phoneme discrimination features included in speech data to determine similarity is realized by the speech search unit 29. On the other hand, the means for dividing the input search keyword based on phonemes, the means for changing the first threshold according to Equation 1 (Math. 1) to obtain the second threshold so that at least two of the divided search keywords may match, and the means for searching for a search object determined by the first threshold and the second threshold are all realized by the speech search unit 29.

Further, the means for repeatedly performing search as consecutively increasing the first threshold to be used in search is realized by the speech search unit 29, which realizes also the threshold adjustment means for consecutively presenting search results. Simultaneously, the means for consecutively outputting (presenting to the user) the search results is realized by a display device (for example, display) 30 or a speech output device (for example, speaker) 31.

Further, the means for determining whether or not keyword division is necessary based on the length of the search keyword is realized by the speech search unit 29, while the means for determining the number of phonemes after the keyword is divided is realized by the speech-/character-use phoneme string generation unit 23 and the speech search unit 29.

In the speech search device in the present embodiment, as shown in FIG. 2, as speech search results, information such as characters and images about search is displayed on the display device 30 (for example, display), while speech information is reproduced as voices from the speech output device 31 (for example, speaker). Only either one of these may be mounted in configuration.

The speech processing device 32 shown in FIG. 2 may be realized using a personal computer in which an ROM, an RAM (hereinafter referred to as memory), a CPU, an HDD, and a speech input/output interface (capable of processing at a sampling frequency of 44.1 kHz with 16 sampling bits, for example) are electrically interconnected significantly with a system bus. It is possible to store the speech database in the HDD, connect the speech input device 21 and the speech output device 31 to the speech input/output interface, compose the means other than those mentioned above as software by using the C# language or C++ language and store them in the HDD so that the software may be read into the memory upon activation, and mainly interlock the memory and the CPU with each other via the system bus, thereby realizing necessary means.

Next, a description will be given of a specific method of speech search with reference to FIG. 3 to 5.

Figure 3:
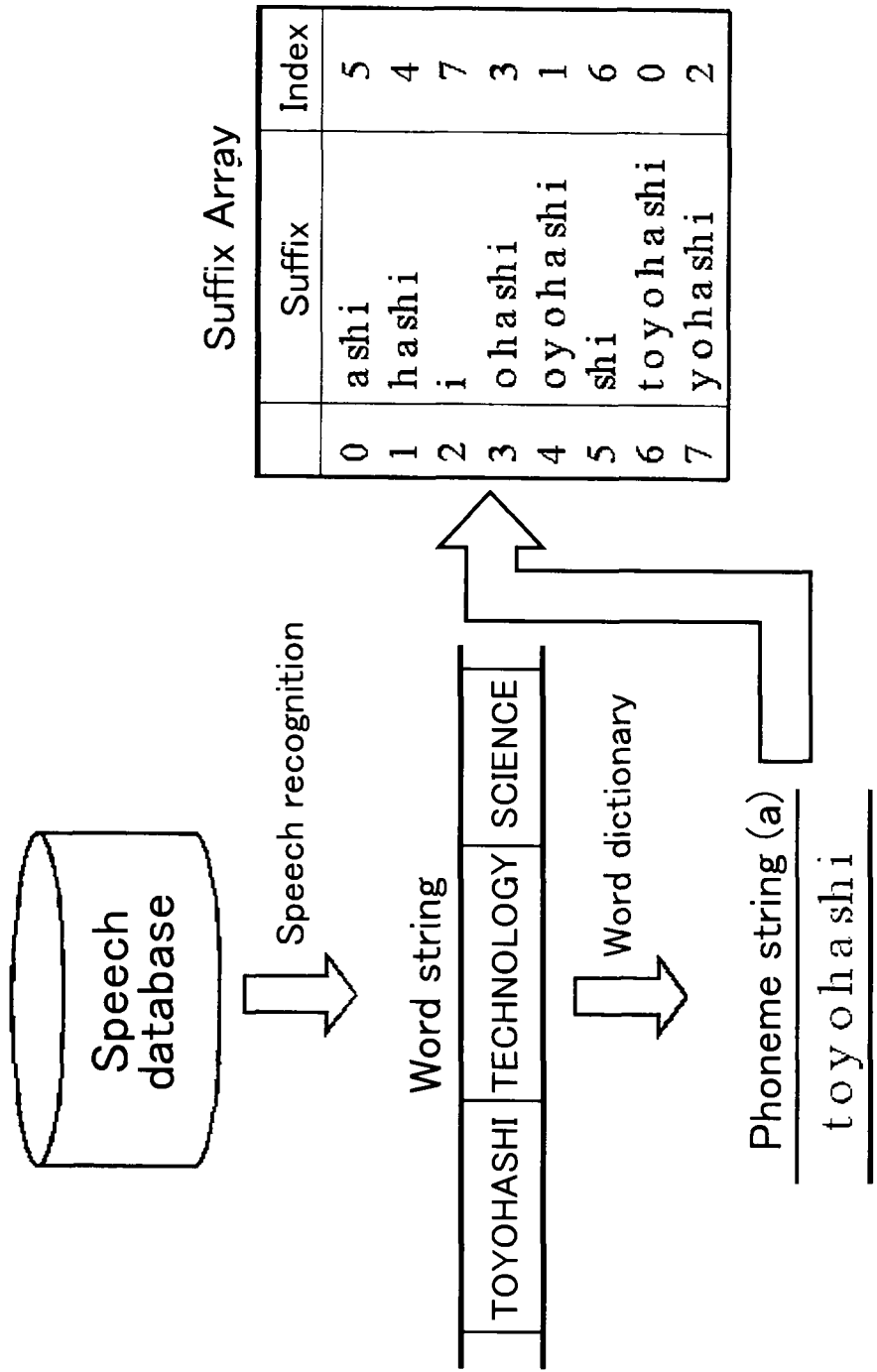
FIG. 3 is an explanatory view of creating a suffix array from a speech database according to the present invention.

FIG. 3 is an explanatory view of creating a suffix array from the speech database. Speech data stored in the speech database 25 is converted into a word string by using the database-use speech recognizer 26 to further convert the word string into a phoneme string (a) by using the speech-use phoneme string generation unit 27. Next, a suffix array is created from the phoneme string by using the suffix array generation unit 28 and saved in the memory or the HDD.

If a search keyword is received in a speech (it is input by the speech input device 21), it is converted into a word string by using the speech recognizer 22 and converted into a phoneme string by using the speech-/character-use phoneme string generation unit 23. Also if it is received in a text (character string) (it is input by the character input device 24), it is converted into a phoneme string by using the speech-/character-use phoneme string generation unit 23. An average value of the first threshold per phoneme to be used in search is set to a small value (for example, 0.0) by the speech search unit 29.

Figure 4:
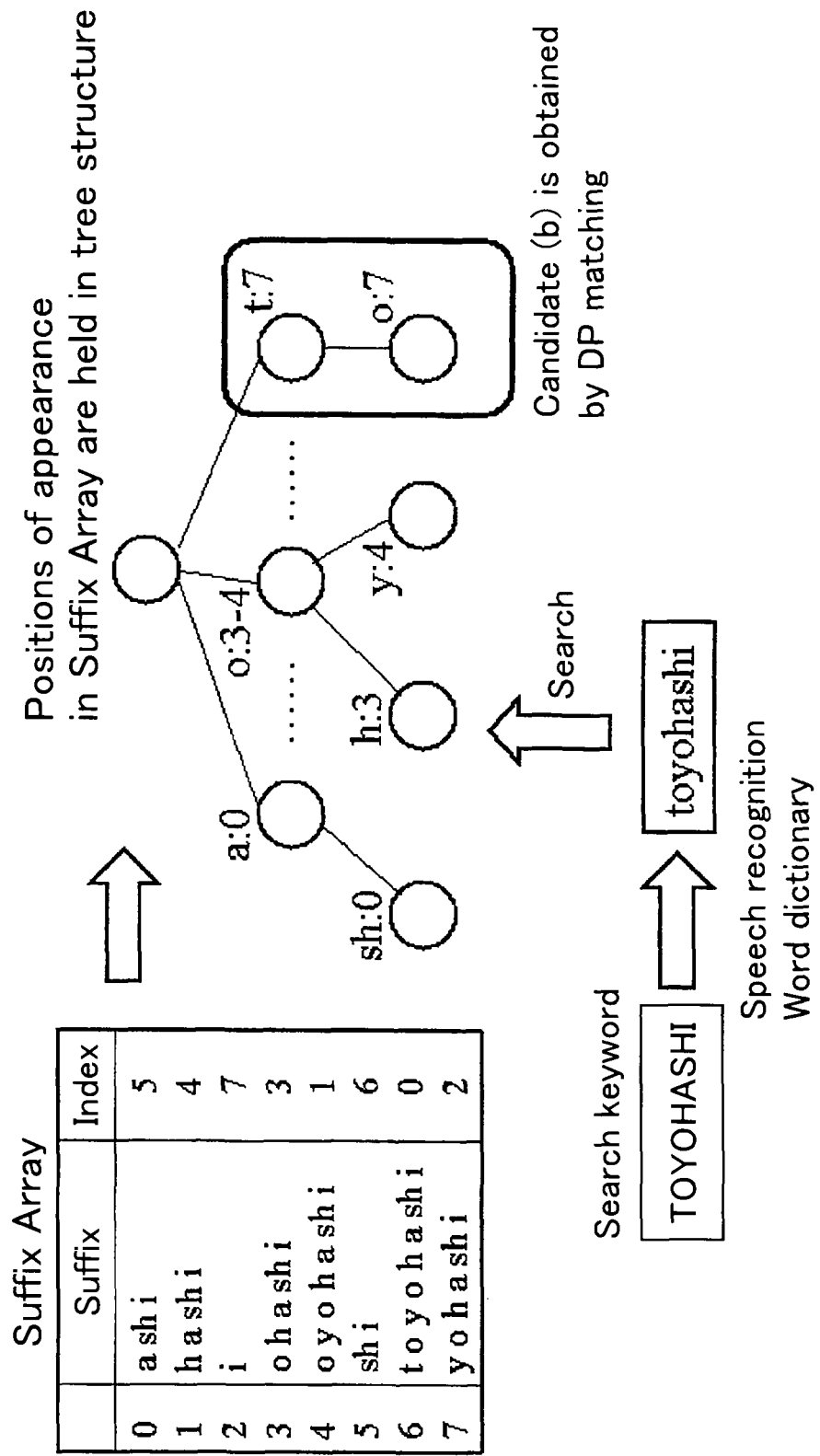
FIG. 4 is an explanatory view of fuzzy search by use of dynamic programming (DP matching) in the suffix array according to the present invention.

FIG. 4 shows an explanatory view of fuzzy search by use of DP matching in the aforementioned suffix array. After the keyword is divided into an optimal number of phonemes or not divided, search is performed in the suffix array by using DP matching. The DP matching uses the first threshold in a case where the keyword is not divided and a value (second threshold) obtained by changing the first threshold by using Equation 1 (Math. 1) in a case where the keyword is divided. In such a manner, a first stage candidate (b) of the search result is obtained. In the case of not dividing, (b) is presented to the user as the result by using the display device 30 and the speech output device 31.

Figure 5:
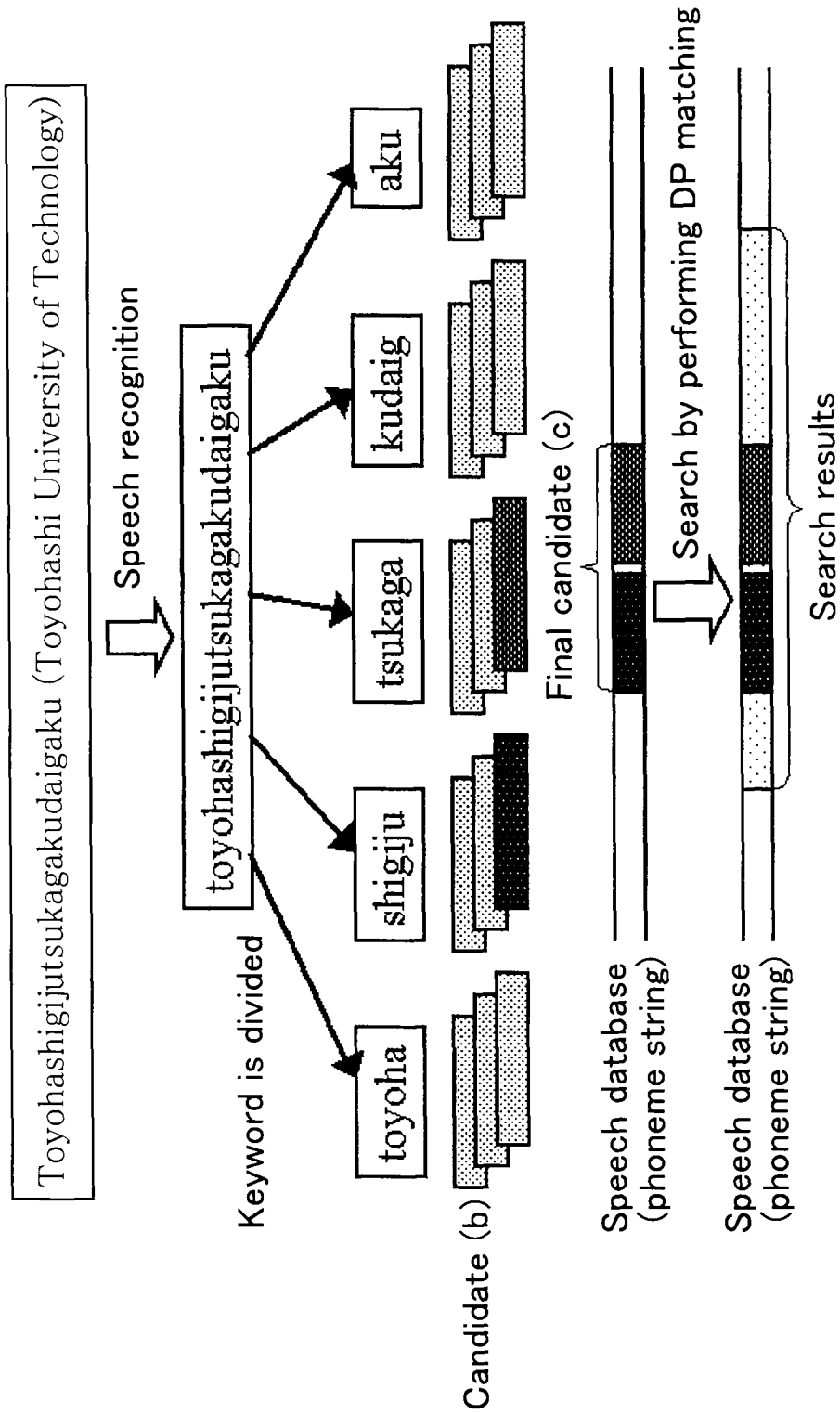
FIG. 5 is an explanatory view of keyword division and speech search according to the present invention.
Figure 6:
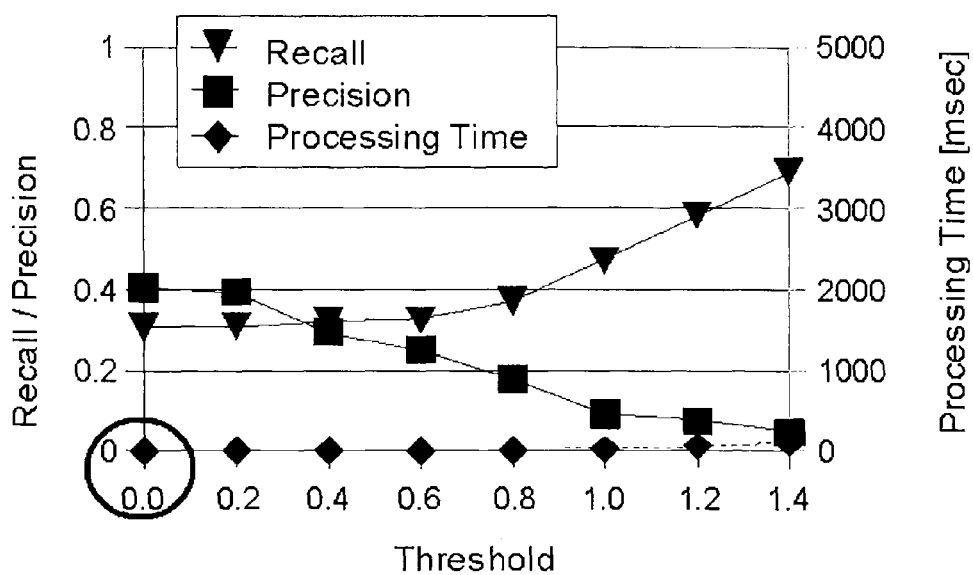
FIG. 6 is a graph of a time that elapses until a first search result is output in a case where a first threshold is minimized by using a six-phoneme search keyword as an object according to an example of the present invention. A horizontal axis gives the first threshold and a vertical axis gives a recall ratio, a precision ratio, and a processing time in search.
Figure 7:
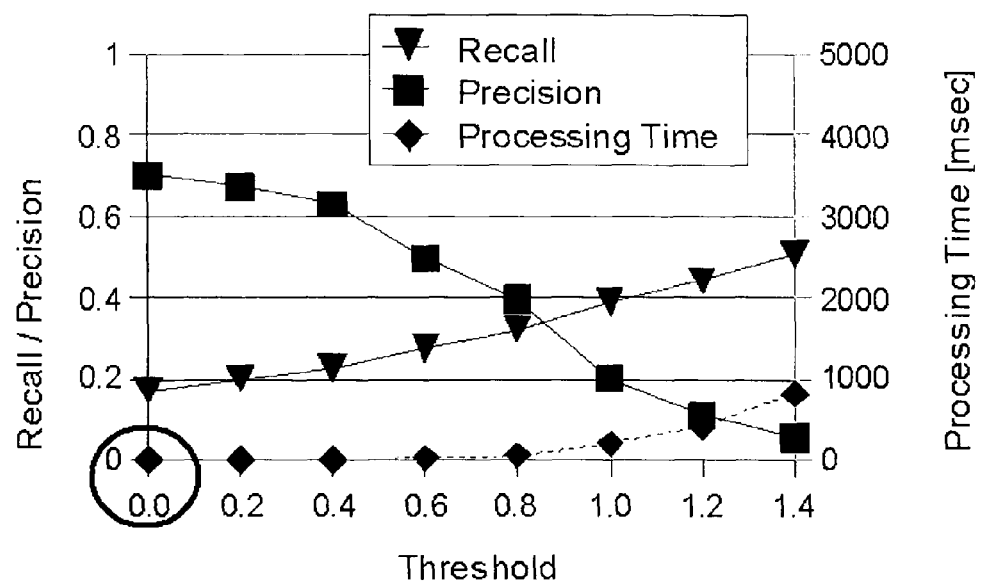
FIG. 7 is a graph of the time that elapses until the first search result is output in a case where the first threshold is minimized by using a 12-phoneme search keyword as an object according to an example of the present invention. A horizontal axis gives the first threshold and a vertical axis gives the recall ratio, the precision ratio, and the processing time in search.
Figure 8:
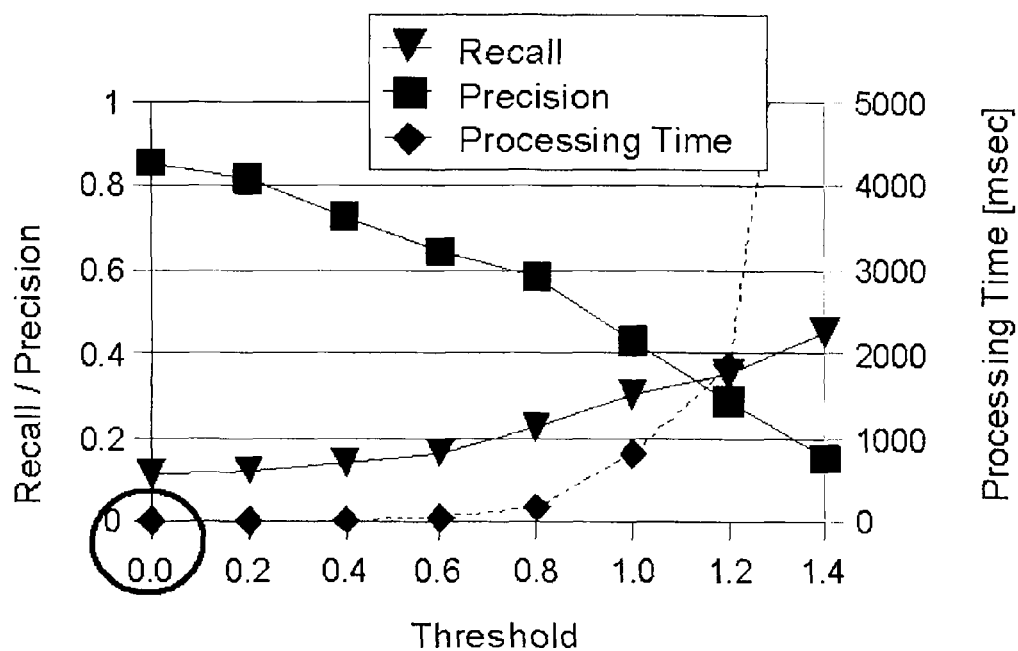
FIG. 8 is a graph of the time that elapses until the first search result is output in a case where the first threshold is minimized by using a 18-phoneme search keyword as an object according to an example of the present invention. A horizontal axis gives the first threshold and a vertical axis gives the recall ratio, the precision ratio, and the processing time in search.
Figure 9:
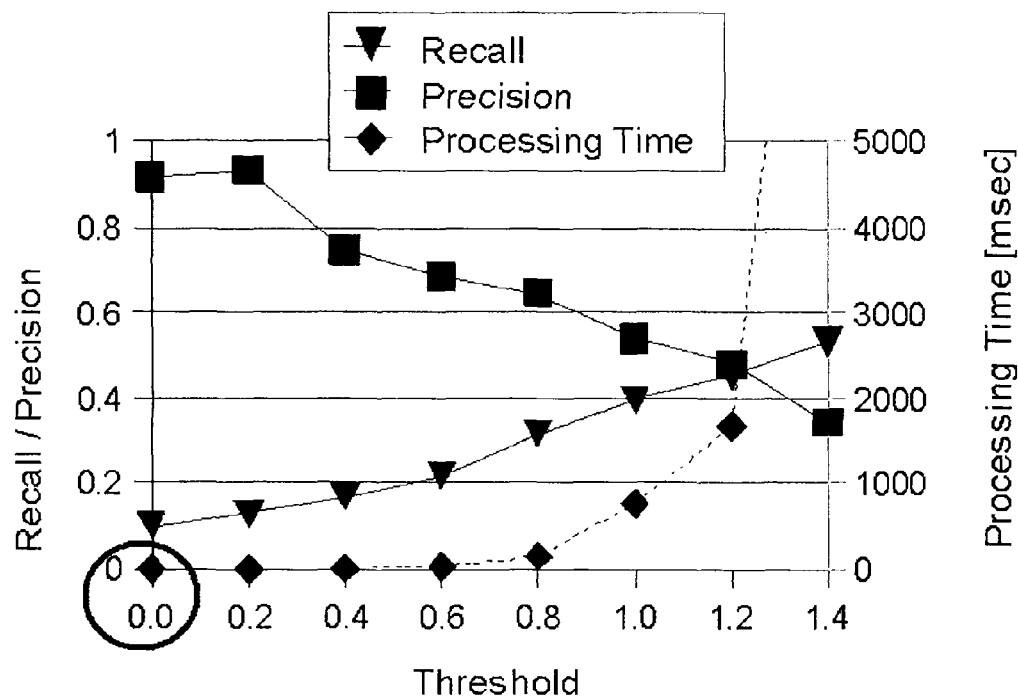
FIG. 9 is a graph of the time that elapses until the first search result is output in a case where the first threshold is minimized by using a 24-phoneme search keyword as an object according to an example of the present invention. A horizontal axis gives the first threshold and a vertical axis gives the recall ratio, the precision ratio, and the processing time in search.

FIG. 5 shows an explanatory view of keyword division and speech search. If the phoneme is divided, at least two of the divided keywords are searched for, so that a final candidate (c) is obtained based on the positional relationship of the search result.

DP matching is performed on the final candidate (c) by using the phoneme string (a) and the first threshold, to present the search result to the user by using the display device 30 and the speech output device 31. After the search result is presented, the first threshold is updated to a little larger value (for example, by adding 0.2) and then a return is made to the DP matching using the first threshold.

EXAMPLE 1

A search experiment was conducted on speech data in the CSJ (Corpus of Spontaneous Japanese) (male speaker, 390 hours) as an object by constituting the speech search device 32 shown in FIG. 2 by using the C# language in a personal computer (Intel (registered trademark), Pentium (registered trademark) D, 2.8 GHz, memory capacity: 4 GB) and the results are shown in FIGS. 6 to 9 as a time that elapses until the first search result is output in a case where the first threshold was minimized (0.0). In FIGS. 6 to 9, the horizontal axis gives the first threshold and the vertical axis gives a recall ratio, a precision ratio, and a processing time in search. The time that elapsed until the first search result was output was several milliseconds in a case where the first threshold was minimized in conditions of 6 phonemes (see FIG. 6), 12 phonemes (see FIG. 7), and 18 phonemes (see FIG. 8), and 24 phonemes (see FIG. 9) included in the search keyword.

EXAMPLE 2

Figure 10:
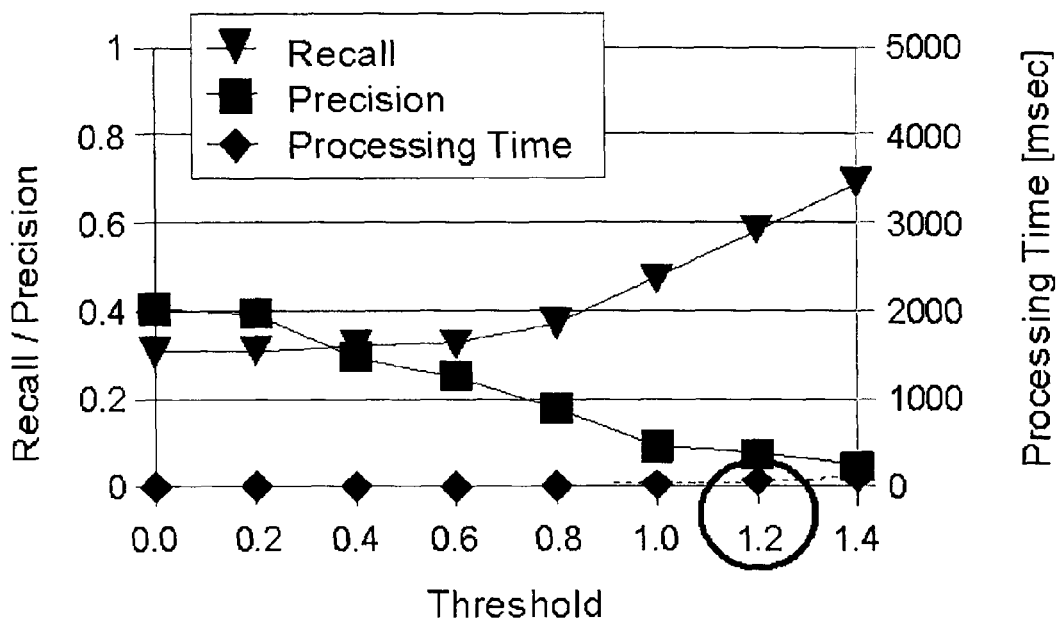
FIG. 10 is a graph of the time that elapses until half of correct keywords are detected by using the six-phoneme search keyword as an object according to an example of the present invention. A horizontal axis gives the first threshold and a vertical axis gives the recall ratio, the precision ratio, and the processing time in search.
Figure 11:
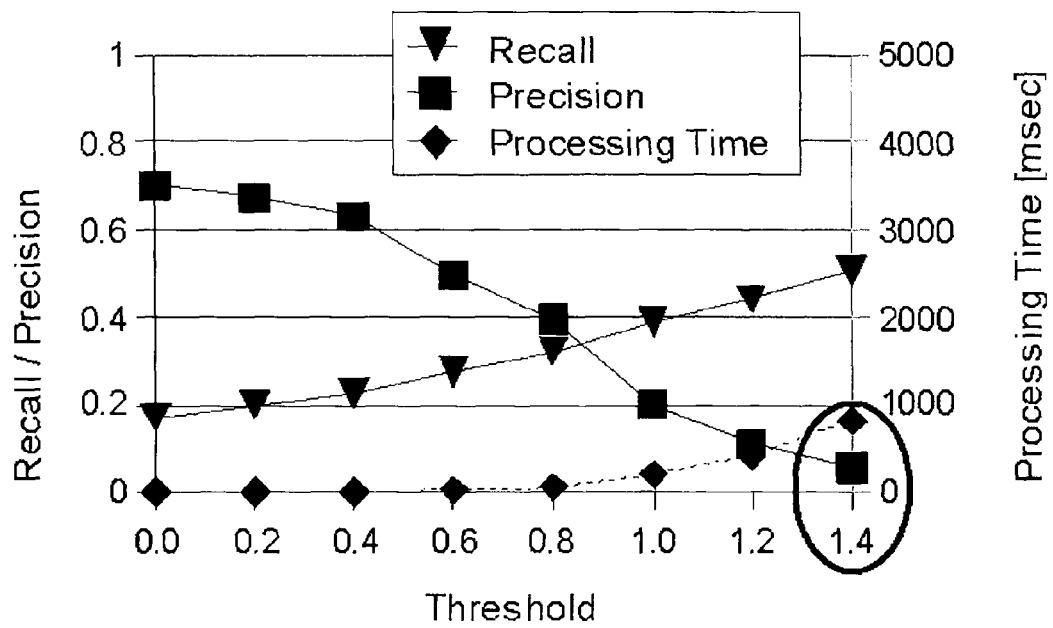
FIG. 11 is a graph of the time that elapses until half of correct keywords are detected by using the 12-phoneme search keyword as an object according to an example of the present invention. A horizontal axis gives the first threshold and a vertical axis gives the recall ratio, the precision ratio, and the processing time in search.

FIGS. 10 and 11 show the time that elapses until half of correct keywords included in the aforementioned corpus are detected. In FIGS. 10 and 11, the horizontal axis gives the first threshold and the vertical axis gives a recall ratio, a precision ratio, and a processing time in search. The time that elapsed until the half of the correct keywords were detected was one second or less in conditions of 6 phonemes (see FIG. 10) and 12 phonemes (see FIG. 11) included in the search keyword.

EXAMPLE 3

Figure 12:
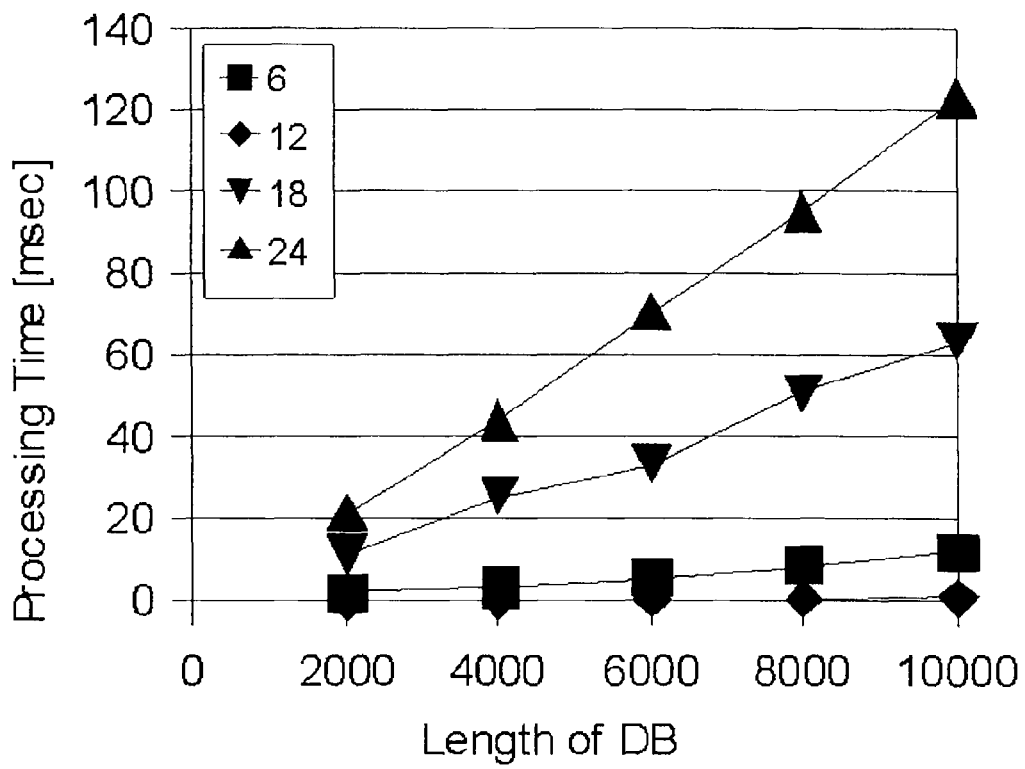
FIG. 12 is a graph of the time that elapses until a first threshold is set to an initial value of 0.0 to search for a search keyword including 6 to 24 phonemes and a group of search results are presented to a user according an example of the present invention. A horizontal axis gives a speech-equivalent time (unit: hour) for an artificial speech database (Mainichi Daily News corpus) and a vertical axis gives a search processing time (unit: millisecond)
Figure 13:
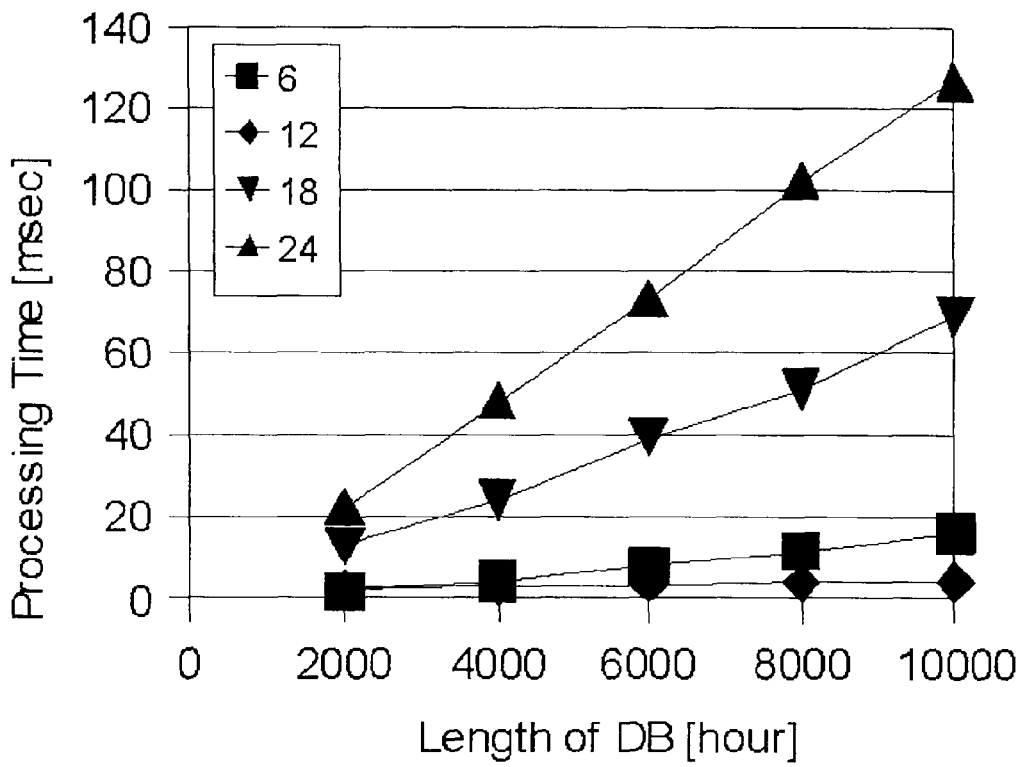
FIG. 13 is a graph of the time that elapses until the first threshold is updated from a state in FIG. 12 to 0.2 to then search for the search keyword including 6 to 24 phonemes and a group of search results are presented to the user according to an example of the present invention. A horizontal axis gives a speech-equivalent time (unit: hour) for the artificial speech database (Mainichi Daily News corpus) and a vertical axis gives a search processing time (unit: millisecond)
Figure 14:
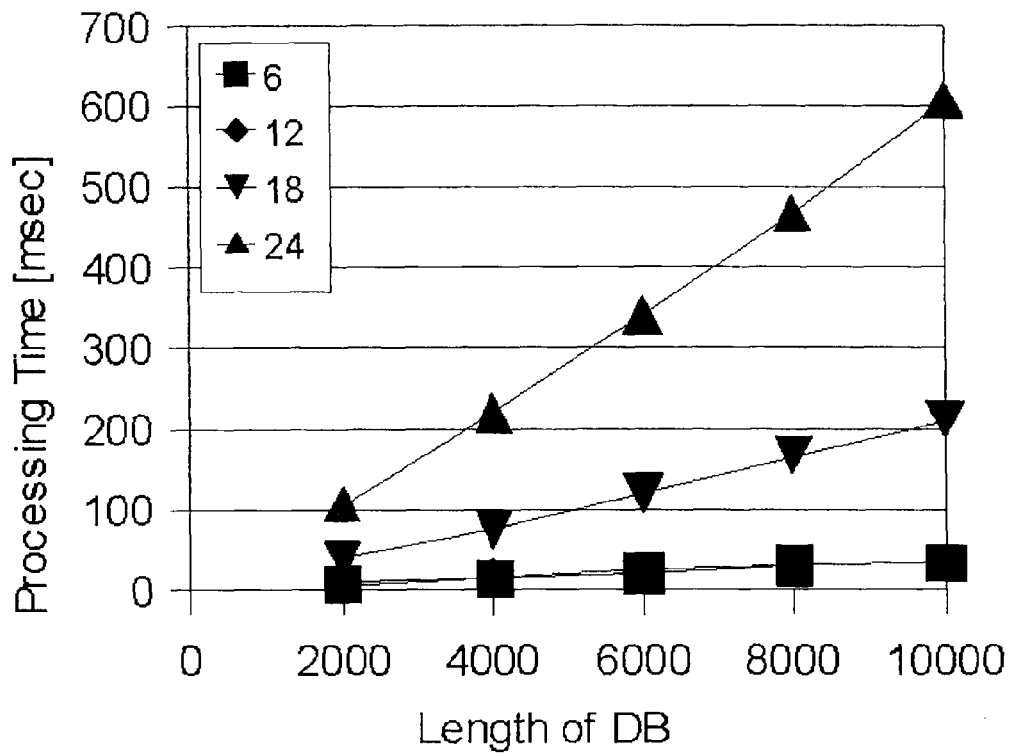
FIG. 14 is a graph of the time that elapses until the first threshold is updated from a state in FIG. 13 further to 0.4 to then search for the search keyword including 6 to 24 phonemes and a group of search results are presented to the user according to an example of the present invention. A horizontal axis gives a speech-equivalent time (unit: hour) for the artificial speech database (Mainichi Daily News corpus) and a vertical axis gives a search processing time (unit: millisecond)

A search experiment was conducted on newspaper article data comparable to 10000 speech-equivalent hours as an object by constituting the speech search device 32 shown in FIG. 2 by using the C# language in the personal computer (Intel (registered trademark), Pentium (registered trademark) D, 2.8 GHz, memory capacity: 4 GB) and the results are shown in FIGS. 12 to 14. Non-patent Literature 1 describes that it takes 2.17 seconds to search a 2031-hour speech database for a 5.2-mora search keyword (in a range of 5 phonemes through 11 phonemes). On the other hand, in the present invention, as shown in FIG. 12, the first threshold was set to 0.0 and a search keyword of 6 phonemes through 24 phonemes was searched for, to find that it took several milliseconds through 120 milliseconds to present a first search result group to the user. Further, the first threshold was updated to 0.2 and then a search keyword of 6 phonemes through 24 phonemes was searched for, to find that it took several milliseconds through 130 milliseconds to present a newly obtained search result group to the user as shown in FIG. 13. Further, the first threshold was updated to 0.4 and then a search keyword of 6 phonemes through 24 phonemes was searched for, to find that it took several tens of milliseconds through 600 milliseconds to present a newly obtained search result group to the user as shown in FIG. 14. From these, it is known that speech search could be conducted speedily.

EXAMPLE 4

Figure 15:
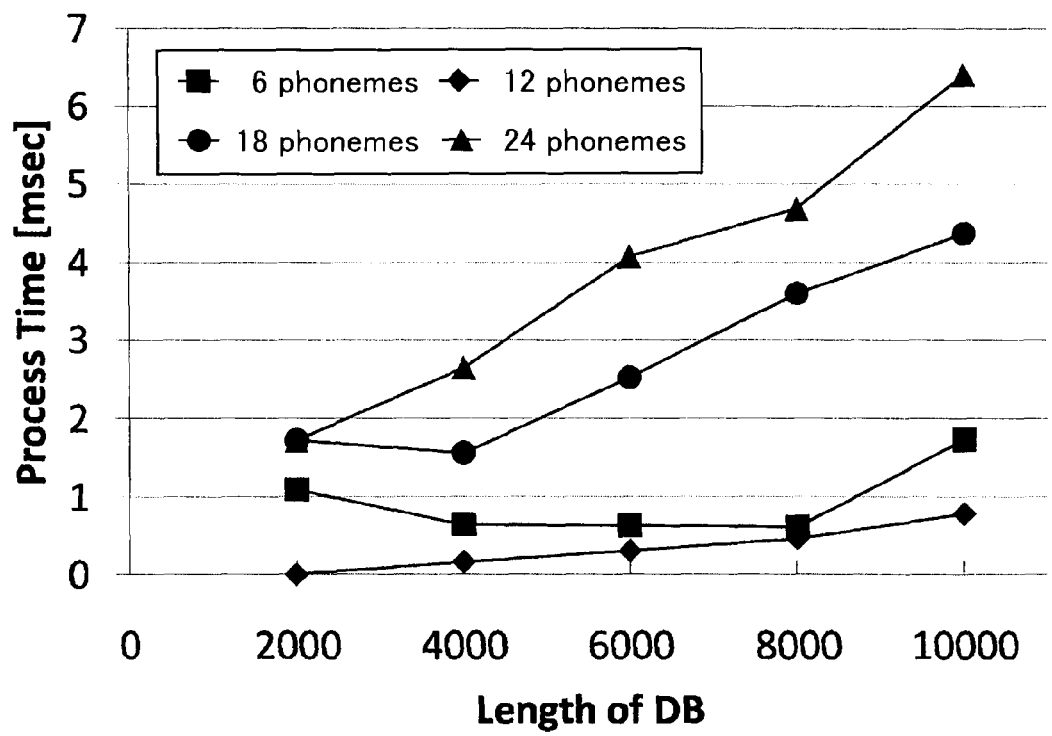
FIG. 15 is a graph of the time that elapses until the first threshold is set to an initial value of 0.0 to search for the search keyword including 6 to 24 phonemes and a group of search results are presented to the user in an implementation environment different from FIG. 12 according to an example of the present invention. A horizontal axis gives a speech-equivalent time (unit:hour) for the artificial speech database (Mainichi Daily News corpus) and a vertical axis gives a search processing time (unit:millisecond)
Figure 16:
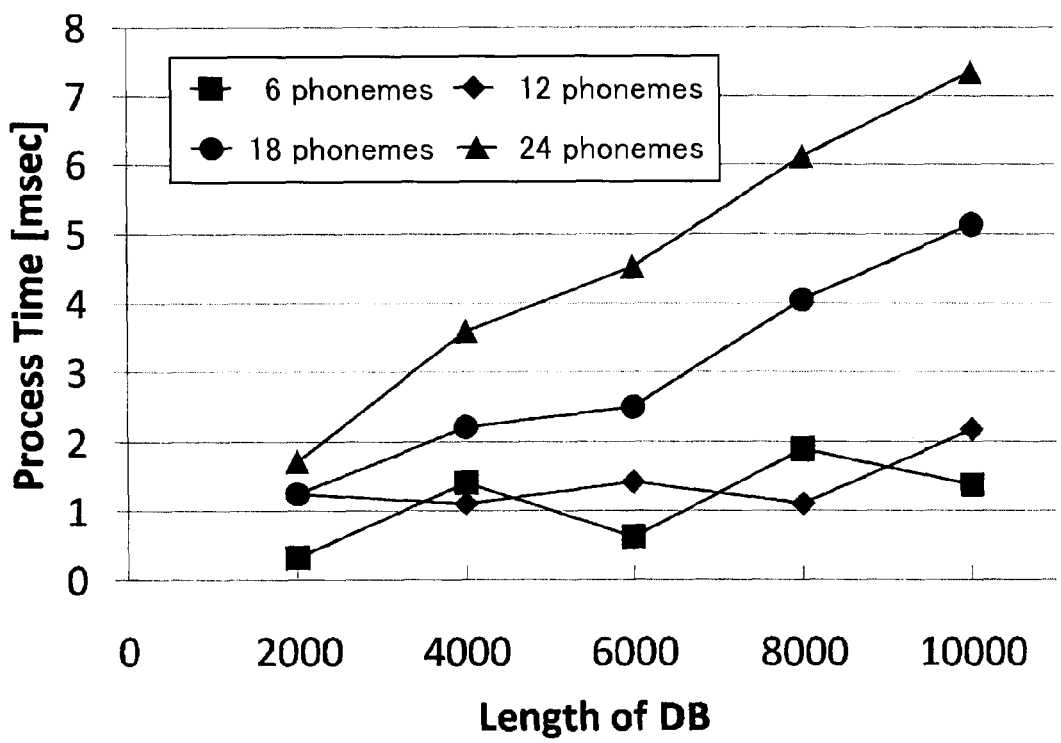
FIG. 16 is a graph of the time that elapses until the first threshold is updated from a state in FIG. 15 to 0.2 to then search for the search keyword including 6 to 24 phonemes and a group of search results are presented to the user according to an example of the present invention. A horizontal axis gives a speech-equivalent time (unit:hour) for the artificial speech database (Mainichi Daily News corpus) and a vertical axis gives a search processing time (unit:millisecond)
Figure 17:
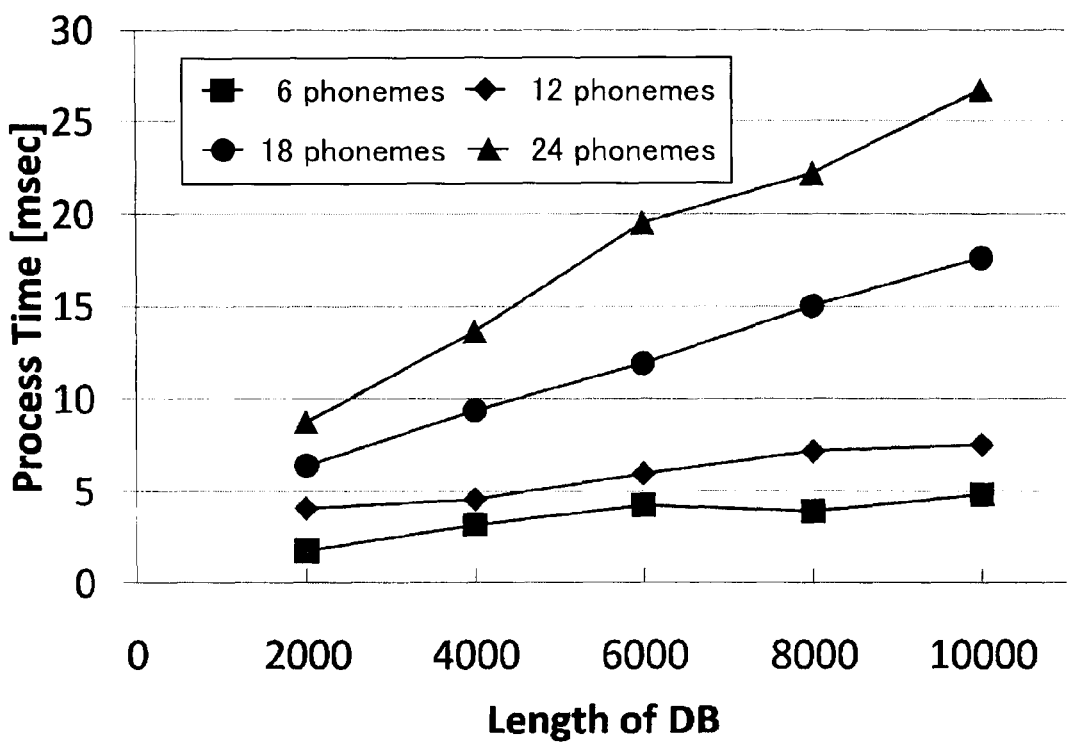
FIG. 17 is a graph of the time that elapses until the first threshold is updated from a state in FIG. 16 further to 0.4 to then search for the search keyword including 6 to 24 phonemes and a group of search results are presented to the user according to an example of the present invention. A horizontal axis gives a speech-equivalent time (unit:hour) for the artificial speech database (Mainichi Daily News corpus) and a vertical axis gives a search processing time (unit: millisecond)
Figure 18:
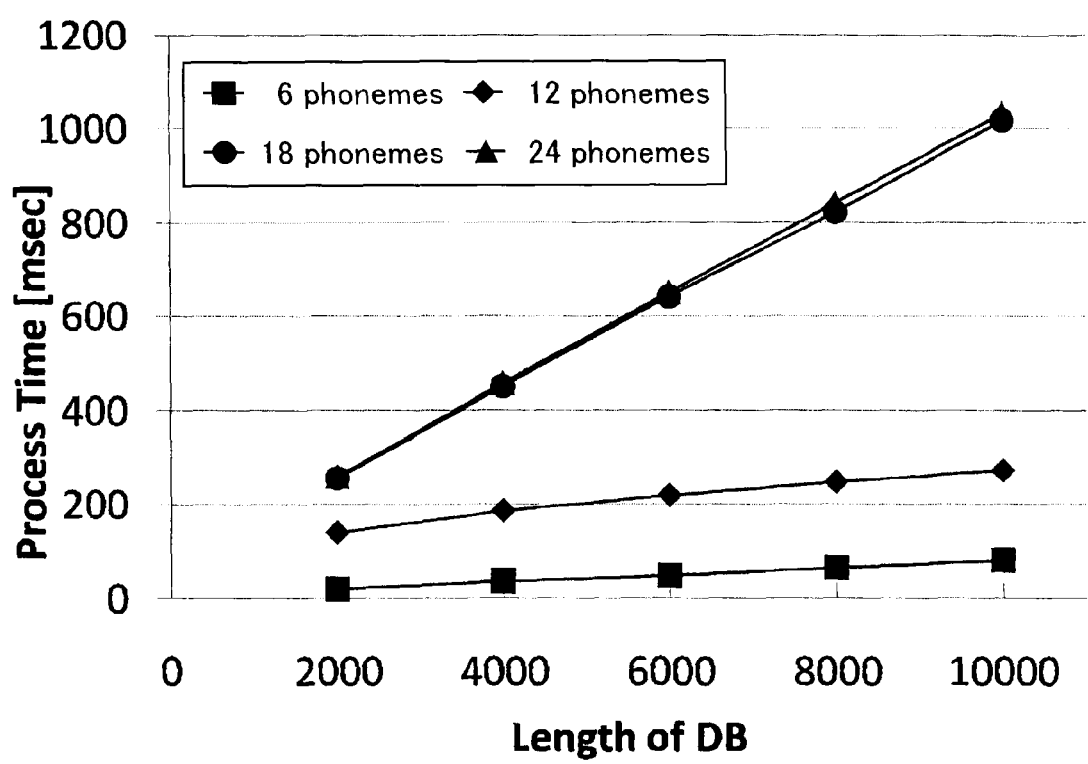
FIG. 18 is a graph of the time that elapses until the first threshold is updated from a state in FIG. 17 further to 1.0 to then search for the search keyword including 6 to 24 phonemes and a group of search results are presented to the user according to an example of the present invention. A horizontal axis gives a speech-equivalent time (unit: hour) for the artificial speech database (Mainichi Daily News corpus) and a vertical axis gives a search processing time (unit:millisecond).

A search experiment was conducted on newspaper article data comparable to 10000 speech-equivalent hours as an object by constituting the speech search device 32 shown in FIG. 2 by using the C++ language in a personal computer (Intel (registered trademark), Core2Duo, E8600, 3.3 GHz, memory capacity: 8 GB) and the results are shown in FIG. 15 to 18. As shown in FIG. 15, the first threshold was set to 0.0 and a search keyword of 6 phonemes through 24 phonemes was searched for, to find that it took several milliseconds to present a first search result group to the user. Further, as shown in FIG. 16, the first threshold was updated to 0.2 and then a search keyword of 6 phonemes through 24 phonemes was searched for, to find that it took several milliseconds to present a newly obtained search result group to the user. Further, as shown in FIG. 17, the first threshold was updated to 0.4 and then a search keyword of 6 phonemes through 24 phonemes was searched for, to find that it took several milliseconds through 27 milliseconds to present a newly obtained search result group to the user. Further, as shown in FIG. 18, the first threshold was updated to 1.0 and then a search keyword of 6 phonemes through 24 phonemes was searched for, to find that it took ten and more milliseconds through about one second to present a newly obtained search result group to the user. From these, it is known that speech search could be performed speedily.

Reference Signs List
21 speech input device
22 speech recognizer
23 speech-/character-use phoneme string generation unit
24 character input device
25 speech database
26 database-use speech recognizer
27 speech-use phoneme string generation unit
28 suffix array generation unit
29 speech search unit
30 display device
31 speech output device
32 speech search device

The invention claimed is:

1. A speech search device for receiving input speech and searching for speech data obtained by sampling the input speech, the speech search device comprising:
a database-use speech recognizer that recognizes the speech data, which is recorded in a speech database to obtain a word string;
a speech-use phoneme string generator unit that generates a phoneme string from the word string obtained by the database-use speech recognizer;
a suffix array generator that generates a suffix array from the phoneme string generated by the speech-use phoneme string generator;
an input device that inputs a search keyword;
an input phoneme generator that generates a keyword phoneme string from the search keyword input by the input device;
a speech searcher that sets a first threshold to be used in a search of the suffix array, that searches the suffix array for the keyword phoneme string, using dynamic programming, based on the first threshold, wherein the speech searcher iteratively adjusts the first threshold, performs the search based on the adjusted first threshold, and presents a result of the search during each iteration, wherein the adjusted first threshold is determined based on:

$$t' = \frac{p}{p-1}t,$$

in which p is a number of divisions with respect to the search keyword, t is the first threshold, and t' is the adjusted first threshold; and
an output device that outputs the result of the search by the speech searcher, during each iteration.

2. The speech search device according to claim 1, wherein the speech searcher divides the search keyword based on the keyword phoneme string when the search keyword is at least a predetermined length, determines an adjusted first threshold, to be used in a search for the divided search keyword, from the first threshold, and
searches for the divided search keyword by dynamic programming by using the adjusted first threshold.

3. The speech search device according to one of claims 1 and 2,
wherein the speech searcher determines
whether keyword division is necessary based on the length of the search keyword, and
determines a resultant number of phonemes after the search keyword is divided.

4. The speech search device according to claim 1, wherein the speech searcher calculates similarity between phonemes in the keyword phoneme string by using an inter-phoneme distance based on phoneme discrimination features in the dynamic programming.

5. A speech search method for receiving an input speech and searching for speech data obtained by sampling the input speech, the speech search method comprising the steps of:
creating a suffix array by converting the speech data into a phoneme string:
receiving a search keyword and converting the search keyword into a keyword phoneme string;
setting a first threshold to be used in a search of the suffix array for the keyword phoneme string;
searching, by a hardware processor, for a search object in the search of the suffix array, using dynamic programming based on the first threshold and outputting a result of the searching; and
an iterative threshold adjusting step of adjusting the first threshold, searching for the search object based on the adjusted first threshold, and outputting the result of the searching during each iteration, wherein the adjusted first threshold is determined based on:

$$t' = \frac{p}{p-1}t,$$

in which p is a number of divisions with respect to the search keyword, t is the first threshold, and t' is the adjusted first threshold.

6. The speech search method according to claim 5, further comprising the steps of:
when the keyword phoneme string is at least a predetermined length, dividing the keyword phoneme string based on phoneme units; and
determining an adjusted first threshold, based on the first threshold, replacing the first threshold with the adjusted first threshold, which is to be used in the search, which is based on the divided keyword phoneme string.

7. The speech search method according to claim 5 or 6, further comprising:
a step of determining whether to divide the keyword phoneme string based on a length of the keyword phone string; and a
keyword dividing step of determining the number of the phoneme units resulting from dividing the keyword phoneme string.

8. The speech search method according to claim 5 or 6, wherein the step of searching for the search object includes a step of calculating similarity between the phoneme units of the keyword phoneme string by using an inter-phoneme distance based on phoneme discrimination features included in the speech data, in the dynamic programming.

9. A non-transitory computer-readable storage medium having computer readable program codes embodied in the computer readable storage medium that, when executed cause a computer to execute:
receiving an input speech and storing speech data obtained by sampling the input speech;
creating a suffix array by converting the speech data into a phoneme string; receiving a search keyword and converting the search keyword into a keyword phoneme string;
setting a first threshold to be used in a search of the suffix array for the keyword phoneme string;
searching, by a hardware processor, for a search object in the search of the suffix array, using dynamic programming based on the first threshold and outputting a result of the searching; and
an iterative threshold adjusting step of adjusting the first threshold, searching for the search object based on the adjusted first threshold, and outputting the result of the searching during each iteration, wherein the adjusted first threshold is determined based on:

$$t' = \frac{p}{p-1}t,$$

in which p is a number of divisions with respect to the search keyword, t is the first threshold, and t' is the adjusted first threshold.

10. The speech search device according to claim 1, wherein the speech searcher divides the search keyword and, based on the adjusted first threshold, performs the search based on the divided search keyword, and wherein the result of the search at each iteration matches at least two positions.

* * * * *